United States Patent Office 2,835,582
Patented May 20, 1958

2,835,582

GELATIN-POLYMERIC HYDROSOL MIXTURES AND PHOTOGRAPHIC ARTICLES PREPARED THEREFROM

William F. Fowler, Jr., and Richard J. Hellmann, Rochester, N. Y., assignors to Eastman Kodak Company, Rochester, N. Y., a corporation of New Jersey No Drawing. Application February 3, 1954
Serial No. 408,033

14 Claims. (Cl. 96—114)

This invention relates to mixtures of gelatin and polymeric hydrosols which are compatible over a wide range of proportions and over the pH range usually encountered in processing photographic emulsions.

Gelatin is widely used in the photographic industry in the preparation of photographic emulsions and the like, but gelatin and similar hydrophilic proteinaceous colloids, particularly the naturally occurring colloids, require special processing due to their nonuniformity, and they also are subject to spoilage on standing unless special precautions are taken. Furthermore it is also desirable to modify the properties of gelatin or such other colloids by the inclusion therein of a synthetically prepared polymeric hydrosol which can be polymerized to give the desired characteristics. The inclusion of polymeric hydrosols has been known heretofore. For the most part, however, the hydrosols which are used are prepared using either an anionic or a cationic surface-active material. In most cases the preparation of the polymer is carried out by homopolymerizing or copolymerizing any of the well known monoethylenically unsaturated polymerizable monomers in an emulsion using a readily available anionic surface-active material. In most cases, emulsion polymerizations have been effected heretofore using anionic surfactants such as sodium lauryl sulfate or sodium oleate. In a few cases, cationic surfactants such as cetyl trimethyl ammonium bromide or octadecyl trimethyl ammonium chloride have been used.

In the processing of photographic emulsions, a pH range of from about 3 to about 7 is ordinarily employed. As a consequence it is necessary that the hydrosols be stable in this pH range in order to prevent coagulation or precipitation which would affect the emulsion adversely. Furthermore it is necessary that the hydrosol contain no coagulum which would interfere with the optical clarity of the emulsions including such hydrosols. Another property which is necessary for optimum utility is that the hydrosols be compatible with gelatin even at relatively high concentrations of the hydrosol. Unless the hydrosol and the gelatin are compatible, a hazy mixture results which deleteriously affects the desired characteristics of the photographic emulsion. In many cases, the proportion of the hydrosol to the gelatin has thus been limited to very small amounts of the hydrosol. Furthermore, the hydrosol must be free from any photographic activity which would preclude its use in photographic material such as the photosensitive sheet materials including film and sensitized paper. Many of the hydrosols, particularly those prepared with cationic surface active agents, are readily coagulated by merely elevating the pH of the emulsion. This, of course, precludes their use in many applications and necessitates close control of the pH range.

It is accordingly an object of this invention to provide new and improved compatible mixtures of gelatin and polymeric hydrosols.

It is another object of this invention to provide polymeric hydrosols which are compatible with gelatin in larger amounts than is the case with the usual polymeric hydrosols, and which are stable over the pH range of at least 3 to 7.

Another object of the invention is to provide new compositions of matter including polymeric hydrosols prepared by polymerizing at least one monoethylenically unsaturated polymerizable monomer in aqueous dispersion in the presence of an ampholytic surface-active agent.

Another object of the invention is to provide gelatin-hydrosol mixtures which do not necessitate close control of the pH during the processing.

Another object of the invention is to provide improved photosensitive sheet material, such as photographic film and sensitized paper including as an emulsion layer a new and improved mixture of gelatin and a polymeric hydrosol containing an ampholytic surface-active material.

Other objects will be apparent from the description and claims which follow.

These and other objects are attained by means of this invention which comprises preparing compatible mixtures of gelatin and a polymeric hydrosol containing an ampholytic surface-active material. The polymeric hydrosols employed in practicing this invention are those hydrosols which are obtained by polymerizing at least one monoethylenically unsaturated polymerizable monomer in aqueous dispersion and in the presence of an ampholytic surface-active material.

The polymeric hydrosols embodying this invention include any of the homopolymers, interpolymers or copolymers of any of the well known monoethylenically unsaturated polymerizable monomers which contain a —CH=C< group. The monomers which are preferably employed are the vinylically unsaturated monomers which contain a $CH_2$=C< group such as the vinyl esters, the acrylates, the acrylic acids, the acrylamides, and similar well known vinylic monomers. In some cases it is desirable to homopolymerize a single monoethylenically unsaturated monomer; and, in other cases, it is desirable to form a polymer of two or more of such monomers. The hydrosols embodying this invention depends in large measure for their unexpected utility on the use of an ampholytic surface-active agent in the polymerization. As a consequence, the invention is applicable to any of the polymers of monoethylenically unsaturated monomers, and it is not intended that the invention be limited to the homopolymers and copolymers which are specifically disclosed herein. Among the monomeric materials which can be used in practicing this invention are the acrylates such as methyl acrylate, ethyl acrylate, methyl methacrylate, methyl ethacrylate, ethyl methacrylate, and similar well known acrylates; vinyl halides such as vinyl chloride and vinylidene chloride; vinyl esters such as vinyl acetate, vinyl butyrate and the like; acrylic acids such as methacrylic acid and acrylic acid; acrylamides, whether substituted or unsubstituted, such as an acrylamide, methacrylamide, N-isopropyl acrylamide, and similar acrylamides; maleamides; fumaramides; maleamates; fumaramates; citraconamides; citraconamates; itaconamides; itaconamates; aromatic compounds such as styrene and the like; vinyl pyridines, whether unsubstituted or substituted; acrylonitrile, and similar well known polymerizable monomers containing ethylenic unsaturation. The polymeric hydrosols can be homopolymers of any of these or other materials as defined herein, or copolymers of two or more of these or other monoethylenically unsaturated polymerizable monomers.

The polymerization is effected in aqueous dispersion, which includes either true solutions or emulsions of the monomeric materials in water. The polymerization reaction mixture embodying this invention includes at least one ampholytic surface-active material and is substantially free of cationic or anionic surfactants. The ampholytic surface-active materials which are employed in practicing this invention are those materials which are effective to lower the surface tension of liquids and which contain active cations and active anions in the same molecule. These materials are thus surface active over the entire pH range, and the kind of activity which they exhibit is dependent upon the particular pH of the medium in which they find themselves. These ampholytic surfactants are described by Schwartz and Perry in the standard text "Surface Active Agents." Typical ampholytic surfactants include, but are not limited to, the alkali metal salts of N-alkyl taurines, N-long chain alkyl betaines, N-alkyl aminoacids, sulfated imidazoline derivatives, sulfonated imidazoline derivatives, and the like. Typical ampholytic surfactants which are eminently suited for use in practicing this invention include N-lauryl-N-methyl taurine sodium salt, N-myristyl-N-methyl taurine sodium salt, N-palmityl-N-methyl taurine sodium salt, N-oleyl-N, N-dimethyl betaine, N-lauryl-N,N-dimethyl betaine, N-myristyl-N, N-dimethyl betaine, N-palmityl-N,N-dimethyl betaine, N-dodecyl glycine, N-cetyl glycine, N-oleyl glycine, and similar ampholytic surface-active materials. These and similar ampholytic surfactants can be used during the emulsion polymerization in aqueous dispersion of any of the polymerizable monomers as described hereinabove, including such materials as styrene, methyl acrylate, methyl methacrylate, n-propyl acrylate, isopropyl acrylate, n-butyl methacrylate, isobutyl acrylate, and the like. The ampholytic surfactant can also be used in preparing 3-component polymers such as those prepared by copolymerizing styrene, n-butyl acrylate and acrylic acid; styrene, n-butyl acrylate and 4-vinyl pyridine hydrochlorides; or styrene, n-butyl acrylate and methacrylamide, or similar copolymers.

The hydrosols are prepared by dispersing the monomeric material in water containing the ampholytic surfactant. The polymerization is usually promoted by the inclusion of a suitable polymerization catalyst such as potassium persulfate, benzoyl peroxide, or similar well known per-catalyst. These and other catalytic materials which are suitable for use in effecting polymerization are well known in the art and form no part of this invention except as such materials may be included in effecting the polymerization of the polymeric hydrosols. The polymerization can be effected at any desired pH, including a pH as low as 2 to 3, or as high as 8 to 10. The amount of ampholytic surfactant which is employed can be varied widely as desired, since even large amounts of such materials have no deleterious effect in photographic emulsions. In most cases, a concentration of ampholytic surfactant of from above 0.1 to about 2% by weight is effective in practicing this invention, although larger or smaller amounts can be used if desired. The hydrosols can, of course, be prepared either batch-wise or by a continuous process.

The aqueous hydrosols which are prepared in accordance with this invention can be admixed directly with an aqueous solution of gelatin. Amounts of the hydrosol equal to the amount of gelatin or higher can be employed without causing precipitation of any of the components due to incompatibility. In practicing the invention, gelatin is usually employed as the hydrophilic proteinaceous colloid, although any of the other well known proteinaceous colloids can be used, including the naturally occurring colloidal materials of this kind.

The compositions prepared by admixing the proteinaceous colloid and the polymeric hydrosol can be compounded with photosensitive materials such as the photosensitive silver halides, with color-forming materials such as are employed in making color film, or with other compounding ingredients normally employed in preparing photographic emulsions. The compositions embodying this invention are readily coated onto a suitable base material such as photographic grade paper or synthetic sheeting such as polyester sheeting or cellulose acetate sheeting or the like commonly used as a film base. The mixtures embodying this invention dry down to give a hard, clear film which adheres excellently to the film base materials, and which has the requisite hydrophilic properties. The compositions embodying this invention can also be used as a tub or beater size in the preparation of photographic paper raw stock, as well as being used as adhesive in the baryta layer, or as an overcoating or undercoating for other emulsion layers in photosensitive sheet material.

A particular advantage of the polymeric hydrosols prepared in the presence of an ampholytic surfactant is their degree of compatibility with gelatin. This compatibility is present even though the monomers which are employed do not contain a hydrophilic monomer such as acrylic acid or any of the acrylamides. Thus, for example, binary copolymers of any of the polymerizable monomers can be employed, and it is not necessary to limit the hydrosol compositions to include a hydrophilic monomer. The compatibility with gelatin occurs over a very wide pH range, and the hydrosols have no photographic activity and hence do not deleteriously affect photographic emulsions containing photosensitive materials. The utility of the compositions embodying this invention is best illustrated by the following examples of certain preferred embodiments of the invention. These examples are included merely for purposes of illustration, and it will be understood that any of the polymeric hydrosols can be employed in similar fashion regardless of the nature of the monomer employed or the ampholytic surfactant, provided such materials are included within the scope of the invention as described hereinabove, and as defined in the appended claims.

EXAMPLE I (A) *Preparation of ethyl acrylate-acrylonitrile hydrosols*

*Ampholytic (high pH).*—A solution of 5 grams of ether-washed technical grade, n-octadecyl dimethyl betaine in 500 ml. of hot tap water was adjusted to pH 10, and placed in a 2-l. 3-necked flask equipped with a thermometer set to record liquid temperature, a dropping funnel, and a mechanical stirrer. The flask was heated to 80° C. on the steam bath, 0.63 gram of potassium persulfate added, and a mixture of 95 grams of freshly distilled ethyl acrylate and 32 grams of acrylonitrile were added dropwise with stirring over a period of 45 minutes. A hydrosol resulted which contained 20 percent solids, had a pH of 6, and contained no coagulum.

*Ampholytic (low pH).*—An emulsion polymerization, similar in all respects to that made with the ampholyte at high pH, except that pH was adjusted to 4.1 at start of polymerization, resulted in a hydrosol having a pH of 4.35, and contained some coagulum.

*Cationic.*—A solution of 5 grams of ether-washed "Octab" (85 percent n-octadecyl trimethyl ammonium chloride, 15 percent oleyl trimethyl ammonium chloride) in 500 ml. of hot tap water was adjusted to pH 4.1, and thereafter treated as with ampholyte. The resulting sol was slightly odoriferous (indicating a small amount of unpolymerized monomers) had a pH of 2.47, and contained some coagulum.

*Anionic.*—An emulsion polymerization, similar in all respects to that with the ampholyte at high pH except that 5 grams of sodium stearate were used as surfactant, resulted in an opaque sol having a pH of 6 and no coagulum, but containing excess sodium stearate which precipitated on cooling.

(B) *Stability of the hydrosols*

Samples of each of the four sols whose preparation is described above were adjusted to a variety of pH values and permitted to stand at room temperature. The results are tabulated below, based upon observations made after 16 hours' standing:

TABLE I

| Surfactant | Result of pH Adjustment | | | | |
|---|---|---|---|---|---|
| | pH=3 | pH=5 | pH=7 | pH=9 | pH=11 |
| Ampholytic (high pH) | coagulated | stable | stable | stable | stable. |
| Ampholytic (low pH) | slight coagulation. | do | do | do | Do. |
| Cationic | stable | do | do | partially coagulated. | gelled. |
| Anionic | coagulated | do | do | stable | stable. |

From Table I it is apparent that the cationic hydrosol was not stable at high pH whereas the ampholytic ones were, whether made initially at high or low pH. While the anionic (sodium stearate) hydrosol was stable at pH's from 5 to 11, these sols contained precipitated sodium stearate whereas the ampholytic sols, over the same pH range contained no discernible precipitate of surfactant.

(C) *Compatibility of hydrosols with gelatin*

Samples of each of the four sols whose preparation is described in (A) were diluted to 10 percent solids and mixed 1:1 with a 10 percent gelatin (photographic quality) solution, the mixtures adjusted to various pH values, coated on glass plates, and dried overnight at room temperature. Results were as shown in Table II:

TABLE II

| Surfactant | Result on Coating with Gelatin | | | | |
|---|---|---|---|---|---|
| | pH=3 | pH=5 | pH=7 | pH=9 | pH=11 |
| Ampholytic (high pH) | (*) | Compatible | Compatible | Compatible | Grainy. |
| Ampholytic (low pH) | Very hazy | do | do | do | Do. |
| Cationic | Compatible | Incompatible | Incompatible | Incompatible | (*) |
| Anionic | (*) | do | do | do | Compatible. |

*Coagulated on mixing.

The results of Table II indicate clearly the advantage of using an ampholytic hydrosol with gelatin. While the anionic binary sol is only compatible with gelatin at very high pH and the cationic one at very low pH, the ampholytic binary sol is compatible with photographic gelatin over a broad range of pH values, from 5 to 9.

EXAMPLE II (A) *Preparation of N-methyl-N-oleyltaurine*

To a mixture of 215 grams of 30 percent aqueous sodium N-methyl taurinate solution and 224 grams of 10 percent ethanolic potassium hydroxide was added, dropwise with stirring, 120 grams of oleyl bromide. The mixture was stirred and heated at reflux for 6 hours, during which time it became homogeneous, and was allowed to stand at room temperature over the weekend. The mixture was then filtered to remove a small amount of crystalline inorganic material and heated under reduced pressure to remove the solvent. The residue was washed with acetone and extracted with four successive 100 ml. portions of absolute ethanol. The alcoholic extracts were chilled, the precipitate collected on a filter and recrystallized from absolute ethanol. The yield of crude product was 28.4 grams.

(B) *Preparation of n-butyl acrylate-acrylonitrile hydrosols*

*Ampholytic.*—A solution of 3.6 grams of the above N-methyl-N-oleyltaurine in 800 ml. of distilled water was adjusted to pH 10 with concentrated sodium hydroxide solution and placed in a 2-l. 3-necked flask equipped with a thermometer set to record liquid temperature, two dropping funnels, and a mechanical stirrer. The flask was heated to 80° on a steam bath, and 1.27 grams of potassium persulfate was added. To this solution was added, dropwise with stirring, over a 30-minute period, a mixture of 178 grams of n-butyl acrylate and 76 grams of acrylonitrile. Simultaneously a solution of 3.5 grams of the N-methyl-N-oleyltaurine in 200 ml. of distilled water, adjusted to pH 10 with concentrated sodium hydroxide solution was added dropwise from the other funnel. The mixture was maintained at 80–82° during the addition and for 15 minutes afterwards. A hydrosol resulted which contained 20 percent solids and no coagulum. The pH was adjusted to 6 with concentrated ammonium hydroxide.

*Anionic.*—The techniques used were identical with those described for the polymerization with an ampholytic detergent. However, an anionic detergent, N-methyl-N-oleyltaurine (a total of 3.2 grams) was used. A hydrosol resulted which contained about 20 percent solids and very little coagulum.

*Cationic.*—A solution of 6.8 grams of 50 percent isopropanol water solution of dimethyl-($\beta$-hydroxyethyl)-($\gamma$-stearamidopropyl) ammonium chloride (50 percent solution) in 800 ml. of distilled water was adjusted to pH 4 with concentrated hydrochloric acid and used for the polymerization medium. A solution of 6.8 grams of the same surfactant (50 percent solution) in 200 ml. of distilled water, adjusted to pH 4 with concentrated hydrochloric acid, was added to the polymerization mixture at the same time as the monomers. With these variations, the techniques listed in the polymerization using an ampholytic detergent were used. A hydrosol resulted which contained about 20 percent solids and very little coagulum.

(C) *Compatibility of hydrosols with gelatin*

The techniques used were identical with those described in Example I (C) except that the gelatin solution had to be added to the cationic sol before elevating the pH stepwise to obtain the results shown in Table III.

TABLE III

| Surfactant | Result on Coating with Gelatin | | | | |
|---|---|---|---|---|---|
| | pH=3 | pH=5 | pH=7 | pH=9 | pH=11 |
| Ampholytic (high pH) | Compatible | Compatible | Compatible | Compatible | Not compatible. |
| Cationic | do | do | do | do | Do. |
| Anionic | Not Compatible | Not Compatible | Not Compatible | do | Do. |

EXAMPLE III (A) *Preparation of methyl-β-(N-methyl-N-oleyl)-aminopropionate*

To a mixture of 50 grams of dimethyloleylamine, 11 ml. of acetonitrile and 180 ml. of ether was added 12.1 grams of β-propiolactone. The mixture was allowed to stand overnight and then distilled to remove ether and acetonitrile. The residue, crude methyl-β-(N-methyl-N-oleyl)-aminopropionate, was used as a detergent in the following polymerization.

(B) *Preparation of an n-butyl acrylate-acrylonitrile hydrosol*

The polymerization was run in a similar manner to that described in Example II(B), using a total of 6.8 grams of crude methyl-β-(N-methyl-N-oleyl)-aminopropionate at a starting pH of 3.2. A hydrosol resulted which contained some coagulum and whose pH was 2.8. When coated 1:1 with gelatin as described in Example I(C), the hydrosol proved to be compatible with gelatin and the mixture dried to give a clear film.

As is apparent from the preceding examples, the polymeric hydrosols prepared by emulsion polymerization in the presence of an ampholytic surface-active material in accordance with this invention possess the combination of desirable properties of being compatible with gelatin over a wide range of proportions, and being capable of use over a wide pH range without the necessity of special controls to prevent coagulation. The mixtures of gelatin and the polymeric hydrosol can thus be used in manufacturing photographic film and photographic paper without having the processes complicated by the necessity of taking special precautions to protect the emulsions embodying the invention. If desired, photosensitive sheet material can be prepared in which either one or more of the layers on the base material consist of the compositions embodying the invention whether uncompounded or containing any of the photographic compounding materials usually employed in preparing photosensitive sheet material. In some cases it is desirable to employ the gelatin-hydrosol mix or the hydrosol alone as a subbing layer to induce adherence of the emulsion layer to the base material. Since the gelatin-containing compositions prepared in accordance with this invention are hydrophilic and thus readily permeable to salt solutions, they can be used as protective layers over the photographic emulsion layer. These compositions dry to hard, clear films which are not readily subject to scratching, and hence are suitable as protective coatings.

Although the invention has been described in considerable detail with particular reference to certain preferred embodiments thereof, it will be understood that variations and modifications can be effected within the spirit and scope of the invention as described hereinabove, and as defined in the appended claims.

We claim:

1. A compatible mixture of gelatin and a separately preformed polymeric hydrosol containing an ampholytic surface-active material, said polymeric hydrosol being the product obtained by polymerizing monoolefinic material consisting of at least one monoethylenically unsaturated polymerizable monomer in aqueous dispersion in the presence of said ampholytic surface-active material which is selected from the group consisting of betaines, glycines, and alkali metal salts of taurines, each of the members of said group containing an N-alkyl group of 12–18 carbon atoms.

2. A compatible mixture of gelatin and a separately preformed polymeric hydrosol containing an ampholytic surface-active material and obtained by homopolymerizing as the sole polymerizable monomer a monoethylenically unsaturated polymerizable monomer containing a —CH=C< group, in aqueous dispersion in the presence of an ampholytic surface-active material which is selected from the group consisting of betaines, glycines, and alkali metal salts of taurines, each of the members of said group containing an N-alkyl group of 12–18 carbon atoms.

3. A compatible mixture of gelatin and a separately preformed polymeric hydrosol containing an ampholytic surface-active material and obtained by polymerizing monoolefinic material consisting of at least one monoethylenically unsaturated polymerizable monomer containing a —CH=C< group, in aqueous dispersion in the presence of an ampholytic surfactant, which is an alkali metal salt of an N-alkyl taurine containing an N-alkyl group of 12–18 carbon atoms.

4. A compatible mixture of gelatin and a separately preformed polymeric hydrosol containing an ampholytic surface-active material and obtained by polymerizing monoolefinic material consisting of at least one monoethylenically unsaturated polymerizable monomer containing a —CH=C< group, in aqueous dispersion in the presence of an ampholytic surfactant which is a betaine containing an N-alkyl group of 12–18 carbon atoms.

5. A compatible mixture of gelatin and a separately preformed polymeric hydrosol containing an ampholytic surface-active material and obtained by polymerizing monoolefinic material consisting of at least one monoethylenically unsaturated polymerizable monomer containing a —CH=C< group, in aqueous dispersion in the presence of an ampholytic surfactant which is an N-alkyl glycine containing an N-alkyl group of 12–18 carbon atoms.

6. A compatible mixture of gelatin and a separately preformed polymeric hydrosol containing an ampholytic surface-active material and obtained by copolymerizing monoolefinic material consisting of a vinylically unsaturated monomer with a different monoethylenically unsaturated polymerizable monomer containing a

—CH=CH< group, in aqueous dispersion and in the presence of an ampholytic surface-active material which is selected from the group consisting of betaines, glycines, and alkali metal salts of taurines, each of the members of said group containing an N-alkyl group of 12–18 carbon atoms.

7. A compatible mixture of gelatin and a separately preformed polymeric hydrosol containing an ampholytic surface-active material and obtained by copolymerizing an acrylate and acrylonitrile in aqueous dispersion in the presence of an ampholytic surfactant which is an alkali metal salt of an N-alkyl taurine containing an N-alkyl group of 12–18 carbon atoms.

8. Photographic film containing a silver halide and including as a layer thereof a compatible mixture of gelatin and a separately preformed polymeric material, said polymeric material being a hydrosol containing an ampholytic surface-active material and obtained by polymerizing monoolefinic material consisting of at least one monoethylenically unsaturated polymerizable monomer in aqueous emulsion and in the presence of an ampholytic surface-active material which is selected from the group consisting of betaines, glycines, and alkali metal salts of taurines, each of the members of said group containing an N-alkyl group of 12–18 carbon atoms.

9. Photographic film containing a silver halide and including an emulsion layer comprising a compatible mixture of gelatin and a separately preformed polymeric hydrosol containing an ampholytic surface-active material and obtained by homopolymerizing a vinylically unsaturated monoethylenic monomer in aqueous dispersion in the presence of an ampholytic surface-active material which is selected from the group consisting of betaines, glycines, and alkali metal salts of taurines, each of the members of said group containing an N-alkyl group of 12–18 carbon atoms.

10. Photosensitive sheet material containing a silver halide and including an emulsion layer comprising a compatible mixture of gelatin and a separately preformed polymeric hydrosol containing an ampholytic surface-active material and obtained by polymerizing monoolefinic material consisting of at least one monoethylenically unsaturated polymerizable monomer containing a

—CH=C< group, in aqueous dispersion and in the presence of an ampholytic surface-active agent which is selected from the group consisting of betaines, glycines, and alkali metal salts of taurines, each of the members of said group containing an N-alkyl group of 12–18 carbon atoms.

11. Photosensitive sheet material including a base layer and an emulsion layer, said emulsion layer comprising a silver halide and a mixture of gelatin and a polymeric hydrosol containing an ampholytic surface-active material and obtained by copolymerizing an acrylate and acrylonitrile in aqueous dispersion and in the presence of an ampholytic surface-active agent which is selected from the group consisting of betaines, glycines, and alkali metal salts of taurines, each of the members of said group containing an N-alkyl group of 12–18 carbon atoms.

12. Photosensitive sheet material including a base layer and an emulsion layer, said emulsion layer comprising a silver halide and a mixture of gelatin and a separately preformed polymeric hydrosol containing an ampholytic surface-active material and obtained by copolymerizing a vinylic monomer with a different monoethylenically unsaturated copolymerizable monomer containing a single —CH=C< group in aqueous dispersion and in the presence of a sodium salt of an N-alkyl taurine containing an N-alkyl group of 12–18 carbon atoms.

13. Photosensitive sheet material including a base layer and an emulsion layer, said emulsion layer comprising a silver halide and a mixture of gelatin and a separately preformed polymeric hydrosol containing an ampholytic surface-active material and obtained by copolymerizing a vinylic monomer with a different monoethylenically unsaturated copolymerizable monomer containing a single —CH=C< group in aqueous dispersion and in the presence of a long chain N-alkyl betaine containing an N-alkyl group of 12–18 carbon atoms.

14. Photosensitive sheet material including a base layer and an emulsion layer, said emulsion layer comprising a silver halide and a mixture of gelatin and a separately preformed polymeric hydrosol containing an ampholytic surface-active material and obtained by copolymerizing a vinylic monomer with a different monoethylenically unsaturated copolymerizable monomer containing a single —CH=C< group in aqueous dispersion and in the presence of an N-alkyl glycine containing an N-alkyl group of 12–18 carbon atoms.

References Cited in the file of this patent

UNITED STATES PATENTS

| | | |
|---|---|---|
| 2,340,358 | Young | Feb. 1, 1944 |
| 2,354,210 | Jacobson | July 25, 1944 |
| 2,360,216 | Fillius | Oct. 10, 1944 |
| 2,368,287 | Chilton | Jan. 30, 1945 |
| 2,376,005 | Potter et al. | May 15, 1945 |
| 2,393,438 | Weisberg | Jan. 22, 1946 |
| 2,397,866 | McQueen | Apr. 2, 1946 |
| 2,504,074 | Jones | Apr. 11, 1950 |
| 2,604,388 | Staehle et al. | July 22, 1955 |

FOREIGN PATENTS

| | | |
|---|---|---|
| 355,573 | Great Britain | Aug. 27, 1931 |
| 562,666 | Great Britain | July 11, 1944 |